T. JIKIHARA.
GROUND BREAKER.
APPLICATION FILED JAN. 29, 1912.
1,051,811.
Patented Jan. 28, 1913.
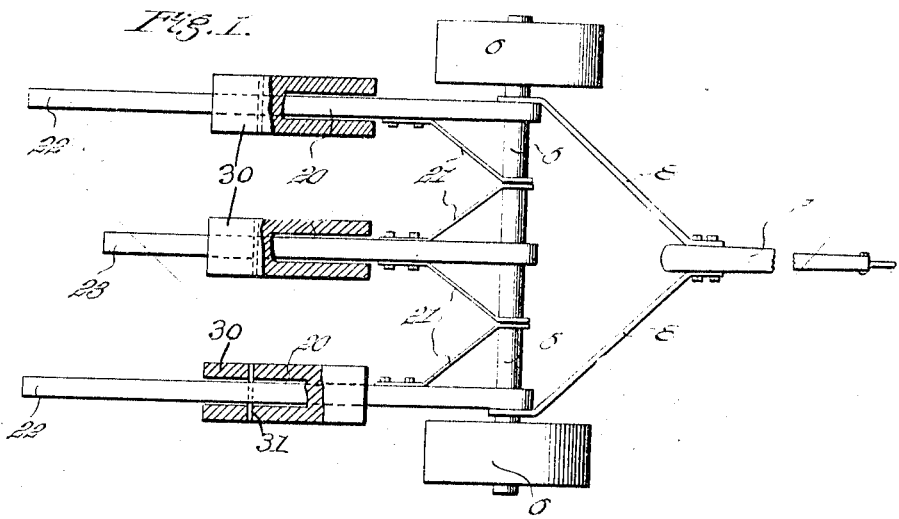
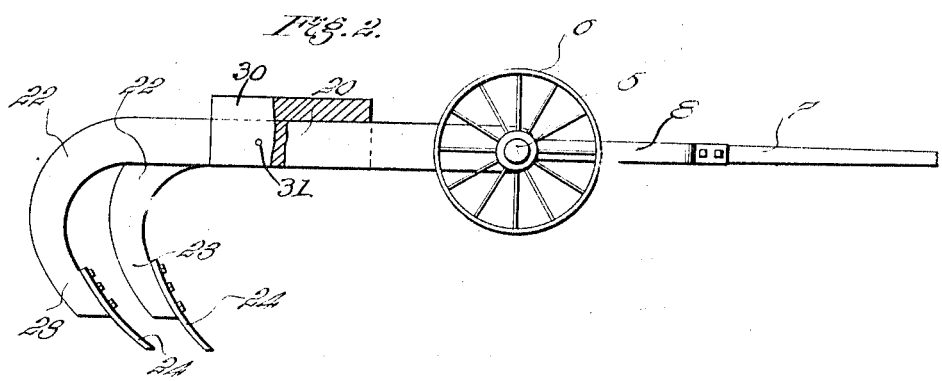
Witnesses
Inventor,
Toshihei Jikihara
by James T. Barkelew
his Attorney.

UNITED STATES PATENT OFFICE.

TOSHIHEI JIKIHARA, OF UPLAND, CALIFORNIA.

GROUND-BREAKER.

1,051,311.  Specification of Letters Patent.  Patented Jan. 28, 1913.

Application filed January 29, 1912. Serial No. 674,146.

*To all whom it may concern:*

Be it known that I, TOSHIHEI JIKIHARA, a citizen of Japan, residing at Upland, in the county of San Bernardino, State of California, have invented new and useful Improvements in Ground-Breakers, of which the following is a specification.

This invention relates to a ground breaking, plowing or cultivating device especially adapted for working in rough hard soil or in stony ground; and my invention is useful not only for breaking ground or fields, but also for street work, grading and excavation and the like.

Broadly considered, my invention consists in an axle suitably supported, say on wheels, and one or more weighted shares pivoted on the axle so as to rise and fall over large boulders. The construction is such that the shares will be kept in the soil to properly break the ground except where they come in contact with portions of the soil which is impossible to break; when they will rise over the obstacle without stopping the progress of the machine over the field, or without injuring the machine. The peculiar construction which allows of these operations will be explained in the following specification, and are illustrated in the accompanying drawings, in which—

Figure 1 is a plan view of my improved device. Fig. 2 is a side elevation of the same.

In the drawings 5 designates a suitable axle supported on wheels 6 and to which a draft tongue 7 is attached through the medium of members 8. This construction, so far explained, is more or less common to agricultural implements.

Loosely pivoted on the shaft 5 is a plurality of rearwardly extending frames 20 of the general configuration shown in Figs. 1 and 2. In the accompanying drawings I have shown these frames as being three in number; but it is obvious that any number may be used. Each frame 20 is so mounted on the shaft 5 that it may independently move thereon in a vertical plane. Braces 21 are supplied for holding the members 20 in proper position. Each of the frames 20 is curved downwardly at its rear end, as at 22, and then forwardly as at 23. On the portion 23 each frame carries a suitable share 24 which may be of any desired configuration. For different classes of work these shares may be changed.

The frames 20 are constructed of heavy solid iron and are thereby individually weighted, as with suitable weights 30 secured by pins 31, so as to force their shares down in to the soil. The weight of the frames, and the position of the ground breaking shares, cause the shares to dig into the soil. But each share may individually rise in case it encounters any hard substance, such as a large boulder. The shape of the frames is such that, although ordinarily the shares are held beneath the surface of the soil, they will ride up over any hard substance which might stop the progress of the ground breaker, or which might injure it. The proportions and configurations shown are adapted very well for breaking hard soil or stony ground for cultivation. Where the soil is particularly hard I may place an individual weight on each of the frames 20; but the frames are not thereby prevented from acting individually. This individual action of each share is the important feature of my device. It allows a single share to ride up over an obstruction without stopping the progress of the ground breaker over the surface and without interfering with the operation of the other shares.

It will be noticed that the central beam or frame 20 is shorter than the two outer ones, the central share 24 being ahead of the other two. This provides that all boulders encountered shall be thrown out to either one side or the other of the breaker; if the central share were behind the other two there would be formed a pocket which boulders would catch and drag.

Having described my invention, I claim:

A device of the character described, consisting of an axle, supporting wheels therefor, draft means attached to the axle, three spaced beams independently directly pivoted on the axle and extending horizontally rearwardly a considerable distance therefrom, each of said beams curving downwardly and then forwardly at their rear ends, the rear end of the central beam being forward of the ends of the other two, a soil engaging share on the rear end of each beam, the angle of the share being such that its forward movement in the soil causes it to sink therein and the horizontal distance from the pivotal axle to the point of the share being greater than the vertical distance between the axle and that point, and weights on the beams to force the share down into the soil, substantially as set forth.

In witness that I claim the foregoing I have hereunto subscribed my name this 20th day of January 1912.

TOSHIHEI JIKIHARA.

Witnesses:
CORA E. MONTGOMERY,
JAMES T. BARKELEW.